United States Patent Office 3,300,993
Patented Jan. 31, 1967

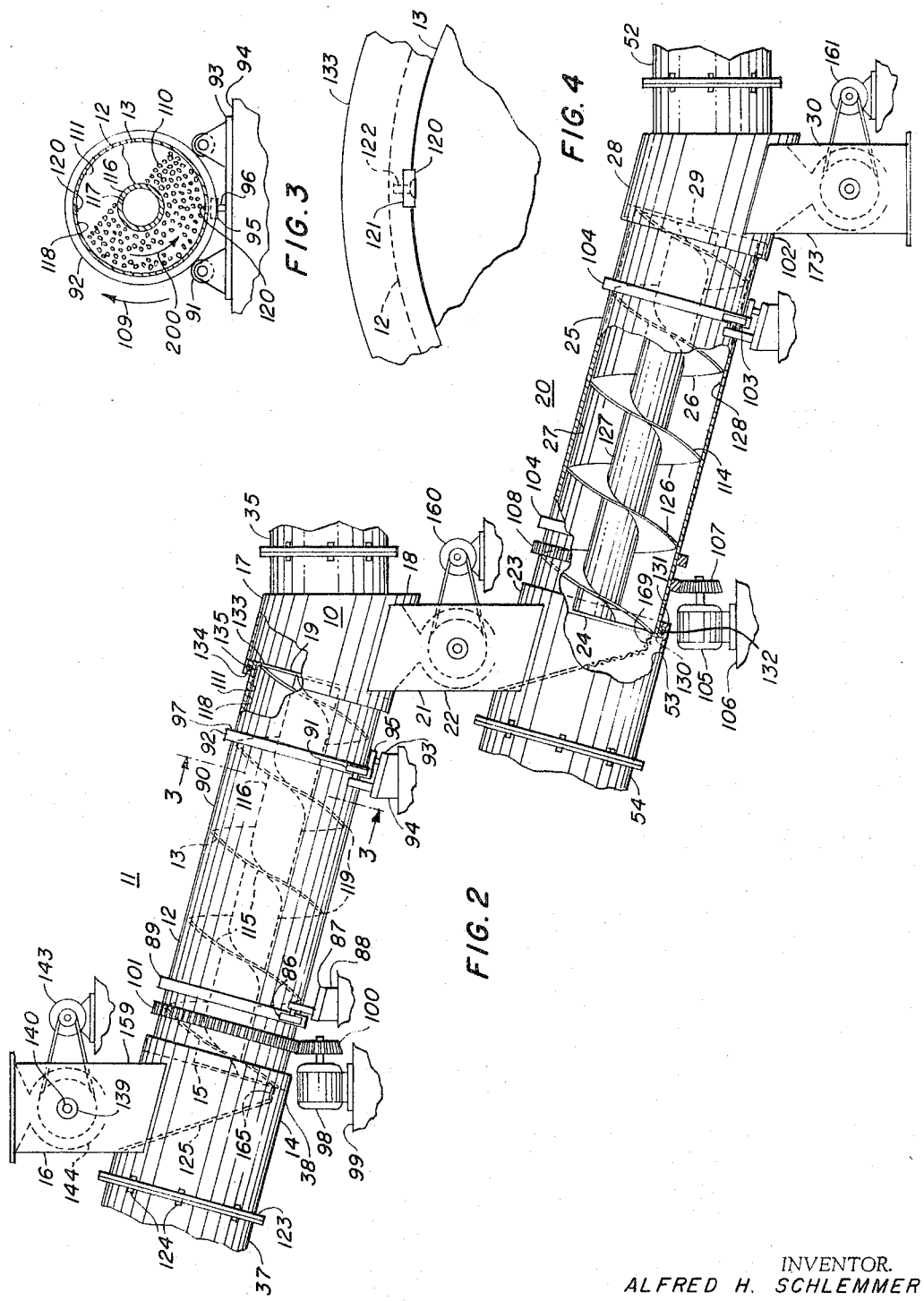

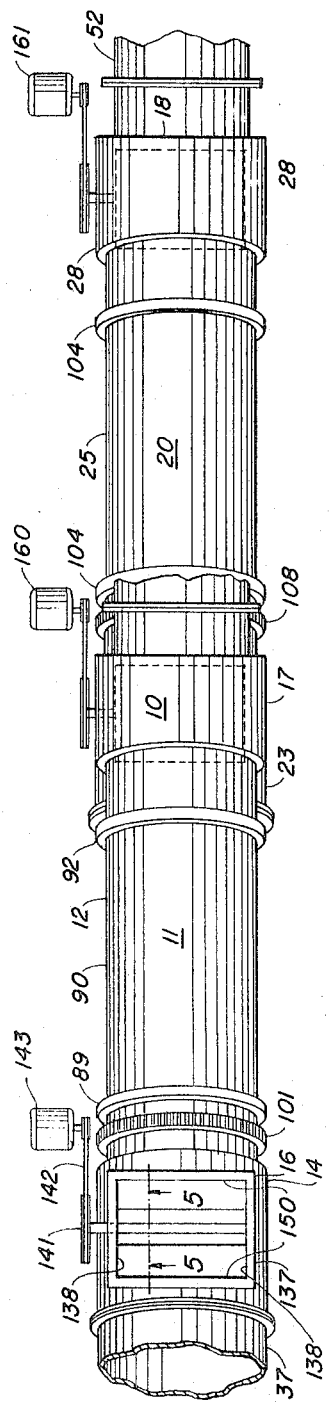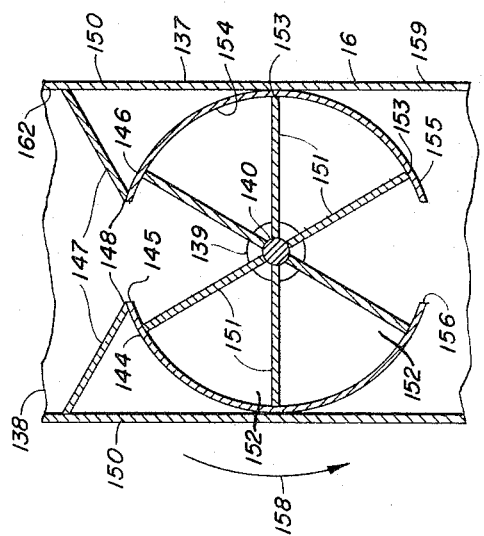

3,300,993
FREEZING APPARATUS AND METHOD
Alfred H. Schlemmer, Winter Haven, Fla. (6033 Pleasant Run Parkway South Drive, Indianapolis, Ind. 46219)
Filed Feb. 25, 1964, Ser. No. 347,172
10 Claims. (Cl. 62—63)

This invention relates to food products and more particularly to equipment and methods used in freezing food products.

A general object of the invention is to provide improved equipment and methods of freezing foods.

The government has set certain standards for classifying frozen foods as frozen food products and the standards require the producers to cool the foods to temperatures that are substantially below the normal freezing temperatures for such foods, and in general, to be classified as a "frozen food product," the food must have a temperature of 0° F., or less. These temperature standards present major problems to the frozen food producers in the way of designing equipment and processes that will do the freezing job needed in an economical way and without damage to the food during the processing thereof.

Most freezing equipment employed today for producing government accepted frozen food products secure the needed heat transfer by circulating a gaseous coolant through a closed circuit that involves direct contact between the food and coolant in a single stage of cooling. This has certain disadvantages which have not been fully appreciated by the process and equipment designers. For example, in order to accomplish the cooling requirement in a single stage gas contact process, the gaseous coolant must have an initial temperature which is substantially below that of the finished frozen product. With a single stage contact process and with the low temperatures established by the government, two-stage compression must then be used in the refrigeration system in order to satisfactorily absorb the heat load from the coolant. As a result, all of the cooling requirement for the food produce is handled in a refrigeration system founded on passing all of the refrigerant through two stages of compression. Two compression stages are needed because of the limitations imposed upon designers of refrigeration equipment by the adiabatic compression cycles. Current designers have apparently overlooked the fact that most of the heat load involved in freezing foods is removed when the food is undergoing actual freezing and that this enables one to use higher temperature coolants for removing the major portions of the overall heat load involved in cooling an unfrozen food to a temperature substantially below its freezing point. It has been found that when an unfrozen food is to be cooled to a temperature exceeding about 8° F. below the average freezing point of the product, that it is more economical to cool the product in two separate stages of heat exchange and to remove the heat load from the gas coolant used in the first stage with a refrigerant that only needs to be subjected to a single stage of compression. Thereafter, the balance of the heat load can be removed in the second contact stage and the gaseous coolant subjected to heat exchange with a refrigerant that has been subjected to a two-stage compression cycle.

Another disadvantage to current freezing methods for foods and which is more real than apparent, is the fact that the food is substantially dehydrated during the freezing process. The causes for this are resident in the desire for industry to provide products in which the units of food are individually frozen, i.e. in a particulate frozen form, rather than clumped together in a frozen mass. As a result, it has been the practice to initially subject the unfrozen food to extremely low temperature coolants and usually under fluidized conditions so as to provide a glaze or frozen surface area on the units. The glaze thereafter prevents the individual units from freezing together as the rest of the cooling is accomplished. This practice of using extremely low temperature gas conditions has been found unnecessary if suitable equipment is provided for handling the product during the freezing process and it has been ascertained that the main cause of product dehydration is in the use of the low temperature coolants. Once the glaze is formed on a particulate unit of moist foods, the moisture in the center of the particle is normally sealed in. However, it has been ascertained that most of the moisture which is removed during the freezing transpires before the particle is glazed and that the removal is due primarily to the low initial vapor pressure of the gas coolant. Consequently, by using higher temperature gas coolants during the process of glazing the food product, in accord with the process described hereinafter, a greater amount of water is retained in the finished product.

Among the objects of the invention is one of providing an improved process and apparatus for cooling unfrozen foods to temperatures which are substantially below the freezing temperatures thereof.

A particular object of the invention is to provide an improved process and apparatus for producing government standard frozen food products having temperatures at least as low as 0° F.

Yet another object of the invention is to provide an improved apparatus and process of cooling unfrozen foods to temperatures substantially below their freezing points and which reduces the amount of product dehydration as compared to more conventionally employed equipment and processes.

Still another objective of the invention is to provide a more economical method of cooling unfrozen foods to temperatures substantially below their freezing points.

Another object of the invention is to provide an improved process of cooling foods to below freezing temperatures that normally prevent use of government accepted antifreezes for continuous defrosting of refrigeration equipment involved in the process.

A further objective of the invention is to provide an apparatus for freezing foods by direct contact with a gaseous coolant and which minimizes the probabilities of the gas coolant following a short circuited path through the product.

Still another objective is to provide an improved apparatus for freezing particulate foods in the form of individual frozen units, and which avoids the formation of frozen clusters of the particles.

Still another objective of the invention is to provide an improved process and apparatus of freezing products to low temperatures and which permits continuous uninterrupted use of the equipment over long periods without the need for shutting down to defrost the equipment.

Still another objective of the invention is to provide a process for cooling food products to temperatures substantially below the freezing points of the products, and which permits savings in expenditures for the equipment involved in the process.

Yet another objective is to provide food freezing equipment that is relatively easy and inexpensive to maintain and repair, the principal moving components which require lubrication and maintenance being external of the area which is subjected to the low temperatures.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 2 is a side elevation of a two-stage direct contact rotary freezing component of the system depicted in FIG. 1, certain parts being broken away or removed to provide clarity.

FIG. 3 is a transverse section along the lines 3—3 of FIG. 2, and shows the position the material assumes between the flights of the screw during normal use of the equipment.

FIG. 4 is an enlarged transverse view of a fragment of the apparatus shown in FIG. 2, and illustrates the means for connecting the screw component to the cylindrical shell component at the discharge end of the first contact stage of the apparatus.

FIG. 5 is a vertical section through an air lock seen in FIG. 6, as seen along the lines 5—5 therein.

FIG. 6 is a plan view of the component shown in FIG. 2.

Figure 1:
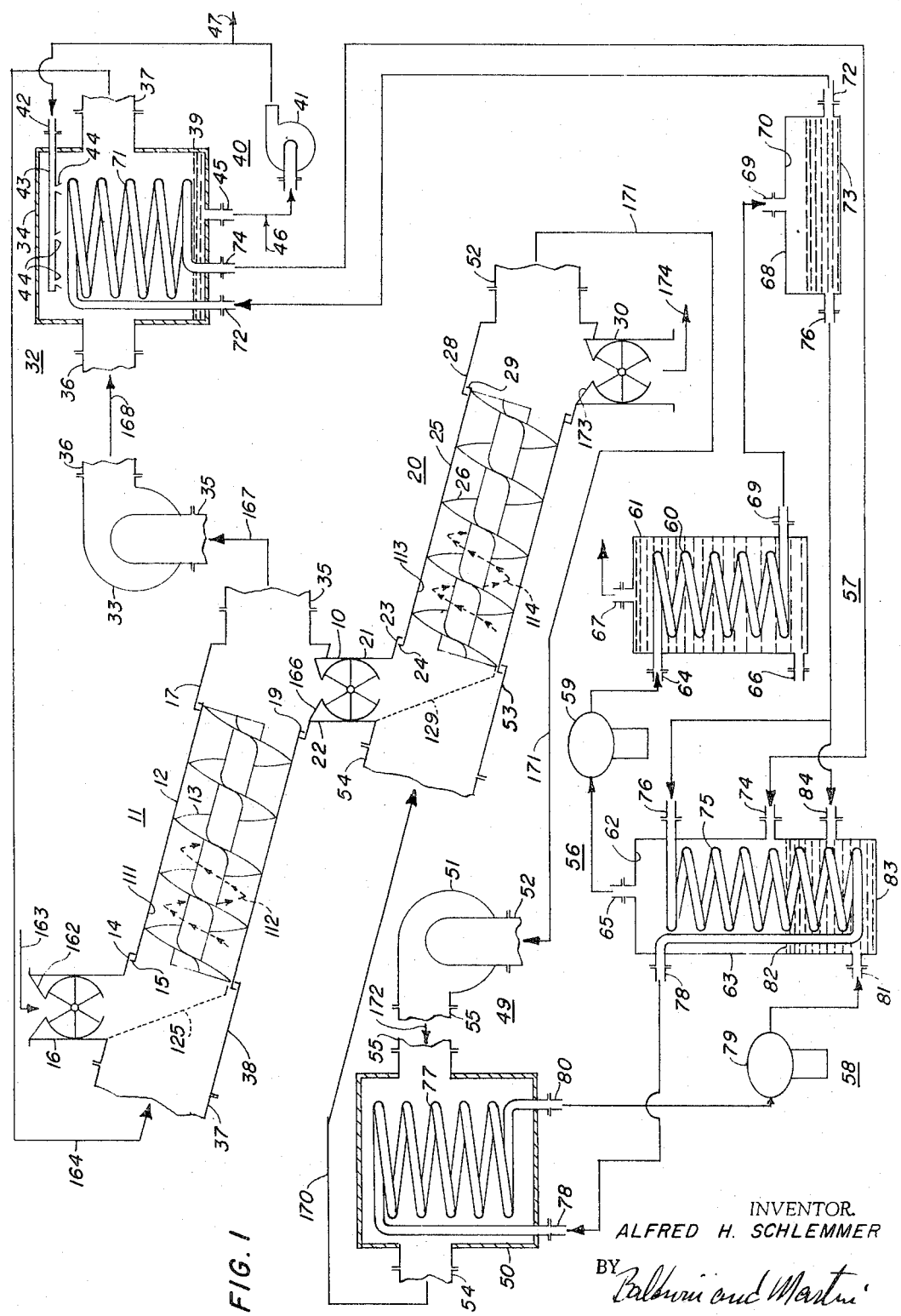
FIG. 1 is in part a diagrammatic illustration of the principle components of a cooling system embodying the invention, and shows the general relationship of the components and the flow paths therebetween.

With particular reference to FIG. 1, the preferred system embodying the invention is depicted schematically therein and includes a two-stage rotary food freezer designated at 10. The first stage 11 has an elongated cylindrical shell or chamber 12 which contains a baffle in the form of a helical screw element 13. Chamber 12 is mounted for rotation about its longitudinal axis, and the screw is secured to chamber 12 in a manner such that it also rotates with the chamber. A cylindrical header 14 is mounted coaxially with and surrounds the feed end 15 of chamber 12. The unfrozen food is fed into the header 14 through a conventional rotary air lock designated at 16. Another header 17 is provided at the discharge end 18 of the first stage. Header 17 is also cylindrical and cups the discharge end 19 of chamber 12.

The material from stage 11 passes to the second stage 20 of the freezer 10 through another conventional rotary air lock 21. The duct housing 22 of the air lock communicates at its upper end with header 17 and at its lower end with the cylindrical feed header 23 of the second stage 20. Header 23 surrounds the feed end 24 of an elongated, open-ended, cylindrical chamber component 25 of the second stage. A helical screw element 26 is coaxially arranged in the hollow 27 of the chamber 25 and is so connected to the chamber as to also rotate therewith. The discharge header 28 of the second stage is like header 17 and surrounds the discharge end 29 of chamber 25. The frozen product from the freezer is discharged from the second stage through still another air lock designated at 30.

The system for cooling the material in the first contact stage is a closed circuit system designated at 32. It includes a gas pump or powered fan 33 and a gas cooling chamber 34 that houses an evaporation coil 71 of an ammonia refrigeration system 56 described hereinafter. The suction side of pump 33 is connected to header 17 by conduit 35 and the discharge or pressure side of the pump is connected to cooling chamber 34 by conduit 36. The inert gaseous medium circulated in system 32 is preferably air, and in chamber 34, the air passes across the coil 71 in indirect heat exchange with the refrigerant therein. Chamber 34 is connected to header 14 of stage 11 by a conduit 37 that conveys the gaseous coolant into the feed end 38 of the stage. After the gas passes through the stage, it is again recirculated through the closed circuit 32.

The bottom portion of chamber 34 serves as a collection sump 39 for the water vapor that condenses in the chamber and which is removed from the material in the first stage. Heat transfer between the gaseous coolant and the refrigerant in coil 71 is through a wetted surface that is provided by a continuous refrigeration coil defrosting system depicted at 40. This component of the cooling system includes a liquid pump 41 which discharges into a conduit 42 that connects with a feed header 43 for a plurality of spray nozzles 44. The spray nozzles 44 are located in chamber 34 above coil 71 and are so directed transversely of the gas flow path in the chamber that the liquid sprays continuously wet the heat transfer surface of the coil. The sprayed liquid trickles down the coil 71 and is collected in sump 39 whereat it is removed through a conduit 45 which is connected to to the sump and also to the suction side of pump 41.

System 40 is prevented from icing up by mixing an antifreeze with the circulated condensate, as by admitting a suitable antifreeze to conduit 45 as indicated by arrow 46. The antifreeze may be any one of those which are accepted to government regulations such as propylene glycol or one of the brine solutions. Typical brine solutions may be aqueous solution of such salts as calcium chloride or sodium chloride. The condensate in excess of that required to operate the defrosting system 40 is removed from conduit 42, as indicated by arrow 47. The method employed for admitting the antifreeze to the system and for withdrawing the excess condensate may be either continuous or discontinuous, and if desired the antifreeze removed with the excess condensate may be recovered in a suitable recovery system and again returned to the defrosting system 40.

The cooling system 49 for the second stage is also a closed circuit system. It includes a cooling chamber 50 that houses another evaporation coil 77 of the refrigeration system 56. A gas pump component 51 is provided in system 49 for continuously circulating the gaseous coolant through the system. Any suitable inert gas may be used in system 49 or in system 52, air being preferred however, because a certain amount of air normally leaks into the systems through the conventional seals employed between relatively moving parts of the freezer 10.

The suction side of pump 51 is connected to the discharge header 28 of stage 20 by means of conduit 52 whereas the pressure side is connected to chamber 50 by conduit 55. The gaseous medium passes across the coil 77 in chamber 50 and returns to the feed end 53 of stage 20 through a conduit 54 that interconnects chamber 50 and feed header 23. After the coolant passes through the stage 20, it is again recycled through the closed circuit of system 49.

The refrigeration system 56 includes a high pressure section 57 and a low pressure section 58. Section 57 includes a compressor 59 that serves as a single compressor for the system of refrigerating the coolant in chamber 34. Compressor 59 also serves as the second stage of a two-stage compression cycle of the system of refrigerating the gas coolant in chamber 50.

The discharge side of compressor 59 is connected by conduit 64 to the coil 60 of a water cooled condenser component 61 of section 57. The suction side communicates with the vapor space 62 in an intercooler component 63 of the refrigeration system 56 by conduit 65. The latent heat of vaporization and the super heat of the refrigerant caused by the compression of the gaseous refrigerant in compressor 59 are removed in condenser 61 by indirect heat exchange with water admitted to the base end of condenser 61 through conduit 66. Conduit 66 is connected to a suitable source of water, and the heated water is removed from the top of the condenser through conduit 67.

The discharge end of coil 60 is connected to a liquid receiver or surge tank 68 by conduit 69. The pressurized and condensed refrigerant collects at the bottom of tank 68 and a vapor space 70 is provided above the liquid level to aid in smoothing out normal pressure surges. A portion of the condensed refrigerant passes to the feed end of coil 71 through a conduit 72 that communicates with the liquid collection section 73 of tank 68, and is connected to the intake end of coil 71. The discharge end of coil 71 is connected with a vapor space 62 in the inter-cooler 63 by conduit 74, and the vaporized refrigerant derived from coil 71 is conveyed to the inter-cooler through the conduit.

The inter-cooler 63 serves as a heat exchanger to further cool condensed refrigerant from section 57 and has a cooling coil 75. The discharge end of coil 75 is connected to the feed end of evaporation coil 77 by conduit 78. The vapor derived by the exchange of heat in chamber 50 is drawn into the suction side of the first stage compressor 79 of section 58 through conduit 80. Conduit 80, as seen in FIG. 1, interconnects the discharge end of coil 77 and the suction side of compressor 79.

The effluent gaseous refrigerant from compressor 79 discharges into a conduit 81 which is connected to the inter-cooler 63 below the level 82 of the liquid maintained therein.

Cooling of the condensed refrigerant in coil 75 is accomplished through evaporation of the liquid refrigerant in the inter-cooler. As seen in FIG. 1, the bottom portion 83 of inter-cooler 63 serves as a container for condensed refrigerant derived from section 57. Liquid refrigerant from tank 68 is delivered to the bottom portion 83 by conduit 84 which is connected to and fed from conduit 76. The suction from compressor 59 causes evaporation of the liquid in cooler 63 and the heat of vaporization is supplied in part through indirect heat exchange with the condensed refrigerant in coil 75. The level 82 of the condensed refrigerant in cooler 63 is maintained by a control valve, not shown, in conduit 84 and which is responsive to a suitable device, not shown, for sensing the level of the liquid in the cooler. Another portion of the heat or evaporization is supplied from the gaseous effluent from compressor 79. This effluent discharges from conduit 81 into the collected liquid and bubbles up through the condensed refrigerant and gives up its heat of compression. The function of the inter-cooler 63 in a two-stage compression system of refrigeration is well known in the art, and it is deemed evident that the discharge from coil 71 is returned to compressor 59 through the vapor space 62 of the inter-cooler primarily to permit entrained condensate with the gaseous discharge to fall out before entering the compressor 59.

The first and second stage components of rotary freezer 10 are best illustrated in FIGS. 2–4. Stage 11 is supported above stage 20, and the axis about which chamber 12 rotates inclines downwardly from the feed end 38 to the discharge end 18 of the stage 11. Chamber 12 is supported at its feed end on spaced trunnions 86 rotatably secured to a plate 87 that is fixed to a concrete support 88. The trunnions 86 contact an annular trunnion ring 89 which is fixed to the outer surface 90 of shell 12. Shell 12 is also supported at the discharge end 19 on spaced trunnions 91 that engage another annular trunnion ring 92 affixed to the shell surface 90. Trunnions 91 are mounted on a plate 93 which is supported on another concrete support 94. Shell 12 is prevented from riding off the inclined trunnions 86 and 91 by wheel bearing 95 that rotates about a shaft 96 having an axis which is perpendicular to the axis of rotation for the shell 12. Shaft 96 is mounted in plate 93 and the wheel bearing 95 contacts the side face 97 of trunnion ring 92. Chamber 12 is rotated about its longitudinal axis by an electrical motor 98 that is mounted on concrete support 99 beneath header 14. The shaft of motor 98 carries a beveled gear 100 that meshes with an annular gear 101 which is fixed to the shell in front of ring 89.

The feed header 23 of stage 20 is located beneath the discharge header 17 of stage 11, and the cylindrical shell 25 also inclines downwardly from its feed end 53 to its discharge end 102. Shell 25 is supported on trunnions, collectively designated at 103, in a manner like that utilized for supporting shell 12, and has trunnion rings 104 which cooperate with the trunnions 103 at the feed and discharge ends of the chamber 25 in a manner like those of the first stage 11. Chamber 25 is rotated about its longitudinal axis by an electric motor 105 that is mounted on concrete support 106 beneath header 23. The shaft of the motor carries another beveled gear 107 which meshes with an annular gear 108 which is fixed to the outer surface of shell 25.

As previously indicated, the screws 13 and 26 are secured to the respective chambers 12 and 25 and rotate therewith. Motor 98 rotates chamber 12 in the direction of arrow 109 so that the particulate food material in the cooling zone 111 defined by chamber 12, is conveyed through the zone from the feed end to the discharge end of the chamber 12. Motor 105 carries out a like function and rotates chamber 25 and screw 26 together in a direction which conveys the particulate material through the cooling zone 113 defined by chamber 25 and from the feed to the discharge end of the chamber 25.

The structure of the screws 13 and 26 is apparent from a consideration of screw 13 as seen in FIGS. 2–4. The flights 115 of screw 13 are wound around an elongated hollow shaft 116 that is plugged at its opposite ends by circular plates 117 so that a short circuit for the passage of gas or particulate material between the opposite ends of the shaft 116 is incapable of developing. The inner edges of the flights 115 are welded to the outer surface of shaft 116. The outer edges 119 of the flights 115 preferably contact the inner surface 118 of shell 12 in the assembly or are in such close proximity thereto as to prevent substantial short circuiting of the gaseous coolant between surface 118 and the flight edges 119.

The flights 115 are interconnected along the edges 119 by a pair of elongated rigid bar components 120 that are welded to the flight edges 119 in parallel with and on opposite sides of shaft 116. Surface 118 has a pair of elongated grooves 121 (FIG. 4), and the bars 120 fit in the respective grooves 121 in the assembled stage 11. The bars serve to connect the screw 13 for rotation with chamber 12 in the assembly. The opposite ends of the bars are releasably fastened to the shell 12 by threaded elements 122 so as to prevent axial movement of the screw 13 in chamber 12. Conduit 37 is bolted to flange 123 of header 14, and by removing the bolts 124 to uncouple and remove conduit 37, and by further removing screen 125 and fasteners 122, the screw element 13 can be axially withdrawn from within the shell 12 to facilitate cleaning of the apparatus. The flights nevertheless are so spaced and arranged in relation to the shell as to define a substantially closed helical passageway through the contact zone.

Screw 26 is of like construction and is arranged and connected to shell 25 in the same manner. The flights 126 are wound around an end plugged hollow shaft 127 and bar components, not shown, fit in suitably spaced grooves in the inner surface 128 of shell 25. Conduit 54 is bolted to the feed header 23 of stage 20, and screw 26 can also be removed from the shell 25 for cleaning in a similar manner by first removing conduit 54 and screen 28 in header 23.

The means for sealing the shells 12 and 25 to the feed headers 14 and 23 respectively, is best shown in FIG. 2 by reference to shell 25 and header 23. The feed end 24 of shell 25 is provided with an annular flange component 130 that projects radially outwardly inside header 23. Header 23 has an annular flange 131 which is spaced from flange 130 and which projects radially inwardly thereat. An annular seal 132 of felt or other suitable material, is fixed to flange 131 in the space between flanges 130 and 131 and serves to minimize air leakage thereat. Header 14 and chamber 12 are of like construction and arrangement and are similarly sealed at the feed end.

The means for sealing the shells 12 and 25 to the respective discharge header 17 and 28 is illustrated by reference to shell 12 and header 17. The discharge end 19 of shell 12 has an annular flange component 133 which projects radially outwardly inside the header 17. Header 17 has an annular flange component 134 which is spaced from flange 133 and which projects inwardly thereat. An annular seal 135 of felt or other suitable material is fixed to flange 134 in the space between the flanges 133 and 134, and serves to minimize gas leakage here. Header 28 and chamber 25 are of like construction and arrangement and are similarly sealed.

Air locks 16, 21 and 30 are of conventional design, and each serves as a means for transmitting the particulate food material between zones of unequal pressure and for obstructing the transmission or passage of a gas between the zones. The structure of the air locks is apparent from consideration of air lock 16 in FIGS. 5 and 6. This air lock communicates with the space in header 14 and with the exterior of the freezer. The housing 137 of air lock 16 has spaced side walls 138 which support transversely aligned bearings 139 in which the opposite ends of a transverse shaft component 140 are journalled. One end of shaft 140 extends through the housing 137 and carries a pulley wheel 141 that is belt 142 driven by motor 143. Air lock 16 has a cylindrical shell 144 which is arranged with its longitudinal axis transversely in the housing and in coaxial arrangement with the axis of shaft 140. Shell 144 has a narrow slot-like opening 145 in its upper wall 146 and the particulate material is deflected into the opening by spaced inclined rectangular plates 147 that form a hopper 162. The lower edges 148 of plates 147 are secured to the shell 144 as seen in FIG. 5, and the upper edges are secured to the front and rear walls 150 of the housing respectively. The opposite ends of the plates are secured to the opposite side walls 138 so that opening 145 provides the only passage in the housing for gas or particulate material thereat. Shaft 140 has a plurality of radially extending vanes 151 which form pockets 152 therebetween and into which the material falls through opening 145 as shaft 140 rotates. Vanes 151 extend between the side walls 138 and are arranged so that their outer edges 153 are in close proximity to the interior surface 154 of the shell so that air leakage thereat is minimal. The lower wall 155 of shell 144 has another slot-like opening 156 through which the material in the pockets 157 falls when they are rotated into communication with opening 156. Thus, as shaft 140 is rotated by motor 143 in the direction of arrow 158, the pockets 152 successively communicate with opening 145 and receive the particulate material, and thereafter successively communicate with opening 156 whereat the material falls through the opening and therebelow through the lower section 159 of the housing. Air locks 21 and 30 are substantially of like construction and are similarly powered by belt driven connections with motor 160 and 161 respectively.

The invention generally contemplates the treatment of unfrozen food products such as fresh vegetables and fruits. Typical products that may be treated include, carrots, peas, corn, string beans, beets, asparagus, lima beans, berries, cherries and other particulate food products. Food products of the kind contemplated for treatment in the apparatus and in accord with the process disclosure herein generally have an average freezing temperature, in the range between 25° F. and 33° F., and when reference is made to the freezing temperature herein, it should be understood that reference is being made to the average freezing temperature. Average freezing temperatures for certain food products together with other pertinent data is shown in the following table:

| (1) | (2) | (3) | (4) | (5) | (6) |
| --- | --- | --- | --- | --- | --- |
| Asparagus | 29.8 | 93.0 | .94 | .48 | 134 |
| String Beans | 29.7 | 88.9 | .91 | .47 | 128 |
| Lima Beans | 30.1 | 66.5 | .73 | .40 | 94 |
| Beets | 31.1 | 90.0 | .86 | .47 | 129 |
| Carrots | 29.6 | 88.2 | .86 | .45 | 126 |
| Corn (Green) | 28.9 | 75.5 | .80 | .43 | 108 |
| Peas (Green) | 30.0 | 74.3 | .79 | .42 | 106 |
| Blackberries | 28.9 | 85.3 | .88 | .46 | 122 |
| Cherries | 26.0 | 83.0 | .87 | .45 | 120 |
| Raspberries | 30.1 | 82.0 | .85 | .45 | 122 |
| Strawberries | 29.9 | 90.0 | .92 | .47 | 129 |

(1) Food product.
(2) Average freezing temperature (° F.).
(3) Water content (percent by weight).
(4) Specific heat above freezing (b.t.u./lb./° F.).
(5) Specific heat below freezing (B.t.u./lb./° F.).
(6) Latent heat of fusion (B.t.u./lb.).

In the process of cooling the unfrozen particulate food product to a temperature substantially below its freezing temperature in the system depicted in the drawings, the unfrozen product is fed into the hopper section 162 at the upper end of air lock 16 as indicated by arrow 163. Motor 143 is continuously operated during the cooling process, and the material is thereby continuously fed into header 14 through the air lock 16. As the particles fall into header 14, they encounter inclined screen 125 and are deflected into the feed end of chamber 12. Screen 125 is adapted to transmit the gaseous coolant which is drawn into header 14 from cooler 34, as indicated by arrow 164. Screen 125 extends between the opposite sides of header 14 and has a lip 165 at the bottom which aids in deflecting the material into zone 111.

During the process, motor 98 continuously drives the shell 12 and screw 13 together in the direction of arrow 109, and the unfrozen material is drawn toward the discharge end 19 by the flights. The feed to stage 11 is so regulated that the spaces between the flights 115 are normally filled to the extent of providing a bed level above the bottom of the shaft 116 so as to avoid short circuiting of the gas over the bed. The feed rate on the other hand is insufficient to completely fill and pack the spaces with the particulate food. As a result, the particles in the bed remain loosely associated and are carried up at one side of the shell and constantly tumble toward the other side of the shell as they are conveyed from the feed end to the discharge end of the zone. As this happens, the gaseous coolant passes through the moving bed of particles in direct contact heat exchange relation and is directed by the flights along the tortuous helical path 112 defined by the spaced flights 115 through the zone 111. As a result, the coolant successively passes through the bed in the spaces between the flights as indicated by arrow 200. The tumbling action provided in the apparatus prevents the particles from freezing together in clumps, and it is deemed apparent, that by virtue of the screw arrangement short circuiting of the coolant between the feed and discharge ends of chamber 12 is practically negligible.

At the discharge end of zone 111, the particles are discharged into header 17 whereat they fall into the hopper section 166 of air lock 21. At this point in the two-stage contact process, the gaseous cooling medium is separated from the particles and withdrawn through conduit 35 into fan 33 as indicated by arrow 167. Fan 33 maintains a pressure at the discharge end of stage 11 which is below that at the feed end of the stage so that the refrigerated coolant is not diluted with air leakage in the system before passing in heat exchange relation with the particles in zone 111. The fan discharge passes as indicated by arrow 168, into the cooler 34.

The circulated gaseous coolant is refrigerated in cooler 34 to a temperature above the refrigerated temperature of the gaseous coolant or medium circulated through the second stage 20 and to a temperature substantially below the freezing temperature of the food. In the preferred practice of the process, the particles are completely frozen in the first stage, substantially all of the latent heat of fusion being removed from the food particles so as to realize the full economies associated with a refrigeration cycle involving only one stage compression. If desired some of the sensible heat below freezing may also be removed in the first stage. A less preferred practice is to remove a portion of the latent heat of fusion of the food product in the second stage. In general however, the process contemplates that at least 50% and preferably in excess of 90% of the latent heat of fusion is removed in the first stage so that at least the surface portions of the particles are frozen and provided with a glaze that prevents them from agglomerating and thereafter freezing together.

Following the first stage treatment, the particles pass into the feed header 23 of stage 20 through air lock 21. Motor 160 is synchronized with motor 143 to feed the stage at the same rate at which the intermediate product is discharged from stage 11. As the products falls into header 23, it is deflected into zone 113 by removable screen component 129, which, like screen 125, has a lip 169 at the bottom. Motor 105 rotates shell 25 and screw 26 together in a manner that provides a tumbling action in the bed like that described with respect to stage 11, as the particles move through zone 113. The gas coolant in this stage of the freezing process is also deflected along the helical path 114, defined by flights 126, and continuously passes through the particulate bed between the flights.

The heat content picked up by the gaseous coolant used in stage 20 is removed in cooler 50 by indirect heat exchange with the refrigerant that has been subjected to the plural stage compression cycle in system 56. The gas coolant or medium in this case is refrigerated to a temperature substantially below the discharge temperature of the finished product. The refrigerated coolant is forced along the closed circuit therefor from cooler 50 to header 23 as indicated by arrow 170. Thereafter, it passes along the tortuous helical path 114 through zone 113 in direct contact heat interchange relation with the particles therein. The coolant is then recycled in the circuit to cooler 50 by fan 51 as indicated by arrows 171 and 172. The finished frozen product discharges from stage 20 into the hopper section 173 of air lock 30 and is continuously removed and transmitted to the exterior of the freezer 30 as indicated by arrow 174 through the air lock.

A process of freezing peas as carried out in a system similar to that depicted in the drawings is exemplified by the following:

FIRST CONTACT STAGE

Food (peas):
    Feed rate _____ 10,000 lbs./hr.
    Feed temp. _____ 70° F.
    Discharge temp. _____ 15° F.
    Heat removal rate _____ 1,433,000 B.t.u./hr.
Gas coolant (air):
    Circulation rate (dry basis) 422,000 lbs./hr.
Cooler intake:
    Temp. _____ 10° F.
    Relative humidity _____ 100%.
Cooler effluent:
    Temp. _____ 0° F.
    Relative humidity _____ 65° F.
Refrigerant ($NH_3$), high side compressor:
    Suction pressure _____ 9 p.s.i.g.
    Discharge pressure _____ 138 p.s.i.g.
Evaporation coil:
    Intake temp. _____ 80° F.
    Discharge temp. _____ —10° F.
First stage contact zone:
    Inside diameter of shell ____ 48 inches.
    No. of screw flights _____ 8.
    Length of shell _____ 16 feet.

SECOND CONTACT STAGE

Food:
    Feed temp. _____ 15° F.
    Discharge temp. _____ —5° F.
    Heat removal rate _____ 84,000 B.t.u./hr.
Gas coolant (air):
    Circulation rate (dry basis)
Cooler intake:
    Temp. _____ 24,000 lbs./hr.
    Relative humidity _____ —20° F.
Cooler effluent:
    Temp. _____ 100%.
    Relative humidity _____ —30° F.
Refrigerant ($NH_3$), low side compressor (first compression stage): 60%.
    Suction pressure _____ —4.36 p.s.i.g.
    Discharge pressure _____ 9 p.s.i.g.
Evaporation coil:
    Intake temp. _____ 10° F.
    Discharge temp. _____ —40° F.
Second stage contact zone:
    Inside diameter of shell ____ 48 inches.
    No. of screw flights _____ 8.
    Length of shell _____ 16 feet.

In an actual run under the indicated conditions, it was found that about 2% dehydration of the product occurred. This is to be contrasted with normal one stage contact processes wherein the product moisture losses are usually about 8–10% on a weight basis. Furthermore, the energy requirement for the refrigeration system in the process exemplified is about 70% of that required in a one stage contact process wherein the heat is removed through a refrigeration system based solely on a duo-compression cycle.

In addition to the advantages mentioned above, the process enables one to use continuous defrosting method when cooling food products to government standards. Propylene glycol and the brines are about the only antifreezes that may be used by food processors. However, these antifreezes have viscosity properties that prevent their usage in systems where the gas coolants are refrigerated to the low temperatures normally encountered in one stage contact processes. For example, propylene glycol becomes too viscous for use as an antifreeze at temperatures below about —20° F. and one encounters similar difficulties with the brines at temperatures below about —5° F.

Any suitable refrigerant may be used, an ammonia refrigeration system being specifically illustrated. However, the invention contemplates that other refrigerants may be used, including the Freons.

From the foregoing it is also evident that the freezing apparatus provides a unique method of contacting the particles and the gas coolant in the contact stages. By revolving the shell and screw element together the particles in the bed are not only moved through the zone but are also caused to tumble over one another as they progress through the contact zone. This ensures constant movement in the bed and avoids clumping and without the need for fluidizing gas pressures in order to secure adequate movement. Furthermore, by providing a substantially closed helical path through the zone for the gas coolant, the coolant is positively directed into and out of the bed in the spaces between the flights.

While only certain preferred embodiments of this invention have been shown and described by way of illustration, many modifications will occur to those skilled in the art and it is therefor, desired that it be understood that it is intended in the appended claims to cover all such modifications as fall within the true spirit and scope of this invention.

What is claimed as new and what it is desired to secure by Letters Patent of the United States is:

1. An apparatus for contacting food particles with a gas coolant comprising a shell having opposite ends and defining an elongated cylindrical zone therebetween in which the particles are contacted by the coolant, a screw element coaxially arranged in said zone and removable therefrom through one of said ends defining a closed helical path for the passage of the coolant therethrough, means supporting said shell on a downward incline from one of said opposite ends to the other thereof, means exteriorly of said zone for rotating said shell about its longitudinal axis, means releasably securing said element to said shell for rotational movement therewith, means at said one of the opposite ends for transmitting the food particles from the exterior of the shell into said zone and for obstructing the transmission of gas between said exterior and said zone thereat, means for passing a gas coolant into direct contact with the particles in said zone and along said path, and means at said other of said opposite ends for transmitting food particles contacted in said zone to the exterior of the shell and for obstructing the transmission of gas between said exterior and said zone thereat.

2. An apparatus for cooling food particles comprising a shell having opposite ends and defining an elongated cylindrical first zone therebetween, a screw element coaxially arranged in said first zone defining a closed helical path for the passage of a gaseous cooling medium therethrough, means for rotating said shell and said screw element together about the axis of the shell means, at one of said opposite ends for transmitting the food particle from the exterior of the shell into said first zone and for obstructing the transmission of gas between said exterior and said first zone thereat, means for passing a gas cooling medium into direct contact with the particles in said first zone and along said path, means defining a second zone, means at the other other of said opposite ends for transmitting particles received from said first zone into said second zone and for obstructing the transmission of gas between said first zone and said second zone, means for passing a gas coolant into direct contact with the particles transmitted to said second zone, and means communicating with said second zone and the exterior of the means defining the second zone for transmitting particles contacted in said second zone to the exterior of said second zone and for obstructing the transmission of gas between said second zone and the exterior of the means defining said second zone.

3. In an apparatus system for cooling unfrozen food particles to a predetermined temperature below the freezing point thereof, the improvement comprising means defining a first zone, first closed circuit means for continuously recycling a gas coolant through said first zone, means for transmitting the unfrozen food particles from the exterior of said first means into said first zone and for obstructing the transmission of gas between said exterior and said first zone thereat, means for conveying the transmitted particles through said first zone in direct contact with the gas coolant therein including screw means located in said zone, means defining a second zone, second closed circuit means for continuously recycling a gaseous cooling medium through said second zone, means communicating with said first closed circuit means and said second closed circuit means for transmitting food particles contacted by said gas coolant in said first zone into said second zone and for obstructing the transmission of gas between the first and second closed circuit means, means for conveying the particles transmitted into said second zone through said second zone in direct contact with the gaseous cooling medium therein, means for transmitting the particles contacted by said gaseous medium in said second zone to the exterior of the means defining said second zone and for obstructing the transmission of gas between the exterior and said second zone thereat, means exteriorly of said second zone for refrigerating said gas medium to a temperature below said predetermined temperature, and means exteriorly of said first zone for refrigerating said gas coolant to a tempeature below said freezing temperature and above the temperature to which said gas medium is refrigerated.

4. In an apparatus for cooling unfrozen food particles to a predetermined temperature substantially below the freezing temperature thereof, the improvement in accord with claim 5 wherein the means for refrigerating the gas coolant comprises refrigerant evaporation means having an intake and a discharge, a single stage refrigerant compressor, means for conveying vaporized refrigerant from said discharge to the suction side of said compressor, condensing means for condensing the compressed refrigerant from said compressor, and means connected to said condensing means and said intake for delivering condensed refrigerant to said evaporation means.

5. In an apparatus for cooling unfrozen food particles to a predetermined temperature substantially below the freezing temperature thereof, the improvement in accord with claim 5 wherein the means for refrigerating the gas coolant comprises refrigerant evaporation means contactable by the gas coolant in said first closed circuit means, circulating and collecting means for collecting condensed water vapor derived from said gas coolant and for continuously circulating collected condensate into contact with said refrigerant evaporation means, and means connected to said circulating and collecting means for mixing an antifreeze with the condensed water vapor.

6. In a method of cooling unfrozen food particles to a predetermined temperature exceeding 8° F. below the freezing temperature thereof, the improvement comprising continuously circulating a gas coolant through a closed circuit system having a zone in which the particles are directly contacted by said gas coolant; continuously refrigerating the gas coolant in said system externally of said zone to a temperature below said freezing temperature by steps including subjecting a gas refrigerant to a single stage compression cycle to compress the gas refrigerant, condensing the compressed gas refrigerant by removing the heat of vaporization thereof, and evaporating the condensed refrigerant in indirect heat exchange relation with said gas coolant; admitting the unfrozen particles to said zone and contacting the admitted particles in said zone with the refrigerated coolant until at least a major portion of the heat of fusion has been removed from the admitted particles, separating the contacted particles from said gas coolant and withdrawing the contacted particles from said closed circuit system; continuously circulating a gaseous cooling medium through another closed circuit system having another zone in which the particles are directly contacted by the gaseous cooling medium; continuously refrigerating the gaseous cooling medium in the other closed circuit system externally of the other zone to a temperature below said predetermined temperature by steps including subjecting a gas refrigerant to a plural stage compression cycle to compress the gas refrigerant, condensing the compressed gas refrigerant from the last of the stages of said cycle and further cooling the condensated refrigerant, evaporating the further cooled condensate in indirect heat exchange relation with said gas coolant; admitting the withdrawn particles to said other zone and contacting the particles admitted thereto in said oher zone with the refrigeraed medium until the particles have been cooled to said predetermined temperature.

7. An apparatus for contacting food particles with a coolant gas comprising a shell structure having opposite ends and defining an elongated cylindrical zone therebetween in which the particles are contacted by the coolant, baffle means removable from within said zone through one of said ends defining a closed helical path for the passage of both food particles and coolant, means exteriorly of said zone for rotating said shell about its longitudinal axis, means releasably securing said baffle means in said shell for rotational movement therewith, means at said one of the opposite ends for transmitting the food particles from the exerior of the shell into said zone and for obsrtucting the transmission of gas between said exterior and said zone thereat, means for forcing a gas coolant into direct contact with the particles in said zone and along said path, and means at said opposite ends for transmitting food particles contacted in said zone to the exterior of the shell and for obstructing the transmission of gas between said exterior and said zone thereat.

8. In a method for cooling unfrozen food particles to a predetermined temperature substantially below the freezing temperature thereof, the improvement comprising tumbling the particles through an elongated first zone, passing a gaseous coolant having a temperature below the freezing temperature of the particles but above said predetermined temperature through the first zone and in direct contact with the particles therein, directing the food particles and coolant through the first zone along a helical path, separating the particles from the coolant, passing the separated particles through a second zone, and passing a gaseous coolant having a temperature below said predetermined temperature in direct contact with said separated particles in said second zone to cool said separate particles to said predetermined temperature.

9. In a method of cooling unfrozen food particles to a predetermined temperature, the improvement comprising continuously circulating a gaseous coolant through a closed circuit system having a zone in which the particles are directly contacted by said gas coolant; continuously refrigerating the gaseous coolant in said system externally of said zone to a temperature below said freezing temperature but above said predetermined temperature by steps including subjecting a gas refrigerant to a single stage compression cycle to compress the gas refrigerant, condensing the compressed gas refrigerant by removing the heat of vaporation thereof, and evaporating the condensed refrigerant in indirect heat exchange relation with said gaseous coolant; admitting the unfrozen particles to said zone and contacting the admitted particles in said zone with the refrigerated gaseous coolant until at least a portion of the heat of fusion has been removed from the admitted particles, separating the contacted particles from said gaseous coolant and withdrawing the contacted particles from said closed circuit system; admitting the frozen particles to another zone, and contacting the frozen particles with cooling medium until the particles have been cooled to said predetermined temperature.

10. An apparatus for freezing food particles comprising: means for continuously circulating a gaseous coolant through a closed circuit system having a zone in which the particles are directly contacted by said gas coolant; means for continuously refrigerating the gaseous coolant in said system externally of said zone to a temperature below said freezing temperature but above said predetermined temperature by steps including subjecting a gas refrigerant to a single stage compression cycle to compess the gas refrigerant, means for condensing the compressed gas refrigerant by removing the heat of vaporation thereof, and means for evaporating the condensed refrigerant in indirect heat exchange relation with said gaseous coolant; means for admitting the unfrozen particles to said zone and contacting the admitted particles in said zone with the refrigerated gaseous coolant until at least a portion of the heat of fusion has been removed from the admitted particles, means for separating the contacted particles from said gaseous coolant and withdrawing the contacted particles from said closed circuit system; means for admitting the frozen particles to another zone, and means for contacting the frozen particles with cooling medium until the particles have been cooled to said predetermined temperature.

References Cited by the Examiner

UNITED STATES PATENTS

| | | | |
|---|---|---|---|
| 2,116,738 | 5/1938 | Zarotschenzeff | 62—381 X |
| 2,223,972 | 12/1940 | Sterling | 62—57 |
| 2,284,270 | 5/1942 | Eberts et al. | 62—381 X |
| 2,385,140 | 9/1945 | Knowles | 62—63 |
| 2,665,568 | 1/1954 | Meyer et al. | 62—63 |
| 3,015,219 | 1/1962 | Veyrie | 62—63 |
| 3,115,756 | 12/1963 | Overbye | 62—380 X |

EDWARD J. MICHAEL, *Primary Examiner.*